US012791144B2

(12) United States Patent
Vap

(10) Patent No.: US 12,791,144 B2
(45) Date of Patent: Nov. 10, 2026

(54) SYSTEMS AND METHODS FOR A SUPPORT AND LEVELING SYSTEM

(71) Applicant: MARVEL INTEGRATION, LLC, Centennial, CO (US)

(72) Inventor: Travis Everett Vap, Englewood, CO (US)

(73) Assignee: MARVEL INTEGRATION, LLC, Centennial, CO (US)

( * ) Notice: Subject to any disclaimer, the term of this patent is extended or adjusted under 35 U.S.C. 154(b) by 0 days.

(21) Appl. No.: 19/381,960

(22) Filed: Nov. 6, 2025

(65) Prior Publication Data

US 2026/0126149 A1 May 7, 2026

Related U.S. Application Data

(60) Provisional application No. 63/717,197, filed on Nov. 6, 2024.

(51) Int. Cl.

| | |
|---|---|
| ***F16M 11/32*** | (2006.01) |
| ***B66F 3/44*** | (2006.01) |
| ***B66F 3/46*** | (2006.01) |
| ***F16M 11/42*** | (2006.01) |
| ***G01C 9/06*** | (2006.01) |
| ***G01C 15/00*** | (2006.01) |

(52) U.S. Cl.
CPC ............... *F16M 11/32* (2013.01); *B66F 3/44* (2013.01); *B66F 3/46* (2013.01); *F16M 11/42* (2013.01); *G01C 9/06* (2013.01); *G01C 15/004* (2013.01); *G01C 15/006* (2013.01)

(58) Field of Classification Search
CPC ........... F16M 11/32; F16M 11/42; B66F 3/44; B66F 3/46; G01C 9/06; G01C 15/006
USPC .......................................... 414/589; 248/550
See application file for complete search history.

(56) References Cited

U.S. PATENT DOCUMENTS 3,197,235 A * 7/1965 Chieger .................... B60S 9/16 254/419
3,690,608 A * 9/1972 Poizner .................. F16M 11/18 248/407
3,944,094 A * 3/1976 Compton .................. B62B 3/10 414/458
4,440,265 A * 4/1984 Spagnoli ................... B66F 7/04 182/141
4,461,455 A * 7/1984 Mills ......................... B64F 5/50 180/125
4,491,452 A * 1/1985 Matovich .............. B60B 29/002 414/427

(Continued)

FOREIGN PATENT DOCUMENTS

CA 2714047 C * 1/2014 .............. E02F 9/028
CN 112279134 A * 1/2021 ................ B66F 7/28

(Continued)

*Primary Examiner* — Taylor Morris
(74) *Attorney, Agent, or Firm* — Holland & Hart LLP

(57) ABSTRACT

A leveling system is provided. The leveling system includes at least one reference device configured to emit a signal that indicates a predetermined height, at least one leveling mechanism configured to change a height of at least one object until the height of the at least one object equals the predetermined height, and at least one support attached to the at least one leveling mechanism and configured to support the at least one object.

20 Claims, 5 Drawing Sheets

(56) References Cited

U.S. PATENT DOCUMENTS

| | | | | | |
|---|---|---|---|---|---|
| 5,044,864 | A * | 9/1991 | Stefan | B60B 33/0039 | 414/459 |
| 5,575,607 | A * | 11/1996 | Grout | B66C 19/02 | 414/460 |
| 5,983,511 | A * | 11/1999 | Osaragi | G01C 15/006 | 33/290 |
| 6,939,098 | B2 * | 9/2005 | Schults | B66C 19/007 | 414/459 |
| 7,438,301 | B2 * | 10/2008 | Schilling | B62B 5/0086 | 280/47.23 |
| 7,747,209 | B2 * | 6/2010 | Yamazaki | G03G 21/1619 | 70/389 |
| 8,292,265 | B2 * | 10/2012 | Benzing | E04G 1/24 | 254/2 B |
| 8,596,613 | B2 * | 12/2013 | Arensdorf | B62B 5/0086 | 254/10 R |
| 10,654,315 | B1 * | 5/2020 | Kamrowski | B60B 33/0047 | |
| 11,161,718 | B2 * | 11/2021 | DeBattiste | B66F 3/24 | |
| 11,484,956 | B1 * | 11/2022 | Vasquez | B25H 1/04 | |
| 11,613,430 | B2 * | 3/2023 | English | B65G 47/90 | 414/815 |
| 12,122,535 | B2 * | 10/2024 | Jones | B64F 1/22 | |
| 2001/0023766 | A1 * | 9/2001 | Ohtomo | E02F 3/842 | 701/50 |
| 2005/0265785 | A1 * | 12/2005 | Kieranen | E01C 19/006 | 404/84.2 |
| 2009/0226257 | A1 * | 9/2009 | Lindley | E04F 21/04 | 404/118 |
| 2010/0104414 | A1 * | 4/2010 | Chilson | B61B 10/04 | 105/72.2 |
| 2010/0183369 | A1 * | 7/2010 | Lindley | G01C 15/006 | 404/84.5 |
| 2015/0251884 | A1 * | 9/2015 | Kelly | B66F 3/46 | 187/216 |
| 2015/0316374 | A1 * | 11/2015 | Winter | G01C 15/006 | 33/293 |
| 2016/0039622 | A1 * | 2/2016 | Kimener | B65G 69/006 | 414/800 |
| 2017/0217467 | A1 * | 8/2017 | Hossler | B62B 3/022 | |
| 2017/0260027 | A1 * | 9/2017 | DeBattiste | B66C 1/12 | |
| 2017/0334692 | A1 * | 11/2017 | Walsh | B66F 3/08 | |
| 2019/0308855 | A1 * | 10/2019 | Wiegel | B60D 1/665 | |
| 2020/0248591 | A1 * | 8/2020 | Cooper | F01D 25/28 | |
| 2020/0248863 | A1 * | 8/2020 | Tahir | G05D 1/0011 | |
| 2021/0114851 | A1 * | 4/2021 | Lock | B66F 3/46 | |
| 2021/0198905 | A1 * | 7/2021 | Pandolfi | E04F 21/20 | |
| 2022/0170744 | A1 * | 6/2022 | Gould | G01C 15/006 | |
| 2022/0185404 | A1 * | 6/2022 | Jaramillo | F02B 63/047 | |
| 2022/0221273 | A1 * | 7/2022 | Hamar | G01C 9/32 | |
| 2023/0003338 | A1 * | 1/2023 | Ma | F16M 11/42 | |
| 2023/0399185 | A1 * | 12/2023 | Ceniza | B65G 69/2882 | |
| 2024/0018792 | A1 * | 1/2024 | Fearn | E04G 13/00 | |
| 2024/0142046 | A1 * | 5/2024 | Beccaro | F16M 11/18 | |

FOREIGN PATENT DOCUMENTS

| | | | | | |
|---|---|---|---|---|---|
| CN | 113418096 | A * | 9/2021 | H05K 5/02 |
| CN | 114646815 | A * | 6/2022 | G01R 29/10 |
| CN | 117053047 | A * | 11/2023 | F16M 11/04 |
| WO | WO-2009019107 | A2 * | 2/2009 | F16M 11/18 |

* cited by examiner

SYSTEMS AND METHODS FOR A SUPPORT AND LEVELING SYSTEM

CROSS-REFERENCE TO RELATED APPLICATIONS

This patent application claims priority to U.S. Provisional Ser. No. 63/717,197, filed 6 Nov. 2024, which is incorporated by reference in its entirety.

TECHNICAL FIELD

The present disclosure relates generally to systems and methods for supporting and leveling objects.

BACKGROUND OF CERTAIN ASPECTS OF THE DISCLOSURE

Manufacturing certain objects may require the object to be level within a certain tolerance for the object to be manufactured within modern tolerance expectations. The objects may be manufactured by forming the object out of raw materials and then shaping the object into the desired shape by cutting, sawing, rasping, or otherwise removing material until the object has the desired shape. If the desired shape includes flat sides, the object needs to be level within a certain tolerance to ensure that once the material has been removed from the object, the object has a level and flat side within the predetermined manufacturing tolerance set for the object.

For example, exterior insulated finish systems (EIFS) are applied to the exterior of buildings to insulate and protect buildings. An EIFS panel can include exterior gypsum board, fluid applied air and water barrier, covered with EPS (expanded polystyrene) insulation, which is then covered with a base coat and mesh, followed by an acrylic finish coat. In addition to insulation, the EPS layer may also be shaped to create architectural details, trims, shapes and reveal features demanded by architectural considerations. EIFS panels are constructed on site and applied to the exterior of the buildings in a labor-intensive process that increases costs and, in some instances, causes unwanted discharge of material from the construction site. The construction and application process includes assembling the EIFS panels on the ground, attaching the partially assembled EIFS panels to the exterior of the buildings, rasping the EPS layer while the EIFS panels are attached to the buildings, and completing the assembly of the EIFS panels. Many commercial or office buildings have flat sides and a key aspect of constructing buildings with EIFS panels is rasping the EPS layers to ensure that the sides of the building are flat. Even small deviations in the EPS layer can make the side of the build appear to have a curved or wavy side.

EIFS panels can be rasped while the EIFS panel is installed on the building because variations in the substructure of the building may affect the positioning of EIFS panels on the building, causing the sides of the building to be curved or wavy. Rasping the EIFS panels includes cutting, grinding, rubbing, or otherwise removing material from the EPS layer to shape the EPS layer into a desired shape. Some architectural designs require intricate shapes to be cut into the EPS layer for aesthetic or functional purposes (i.e., shapes for proper water drainage).

However, the main purpose of rasping commercial and office buildings is to rasp the EPS layer to ensure that the sides of the buildings are flat after installation and construction.

Skilled labor and human judgment are required to properly rasp and flatten the EIFS panels. Specifically, a skilled laborer uses a rasping device, a handheld vacuum rasping device, which shaves the surface of the EPS layer down until the surface of the individual EIFS panel is consistent with the surfaces of adjacent EIFS panels such that the surface of the building is flat. The manual rasping process is very labor intensive and requires skilled human judgment, increasing the cost of installing and completing construction of the building.

Additionally, because the EPS layer is formed of expanded polystyrene, the rasping process generates waste in the form of polystyrene beads. These beads may fly or drift off of the EPS layer during the rasping process and may land on the ground. Some construction processes attempt to mitigate this risk by using vacuum rasping devices or wrapping the building with plastic during the rasping process. However, these mitigation measures do not capture all or even most of the polystyrene. As such, at least some of the polystyrene beads fall to the ground and may be blown or drained off the construction site due to wind or rain. These polystyrene beads may impact the quality of water discharged to rivers, oceans, landfills, and/or other discharge areas.

Accordingly, there is a need for system and method for supporting and leveling objects, such as EIFS panels, which enables the objects to be manufactured with flat or level sides in a manufacturing facility to reduce costs and to decrease unwanted discharges of material to the environment.

BRIEF SUMMARY OF SOME ASPECTS OF THE DISCLOSURE

One aspect of the present disclosure relates to a leveling system including at least one reference device configured to emit a signal that indicates a predetermined height, at least one leveling mechanism configured to change a height of at least one object until the height of the at least one object equals the predetermined height, and at least one support attached to the at least one leveling mechanism and configured to support the at least one object.

Another aspect of the present disclosure relates to a leveling system including at least one reference device configured to emit a signal that indicates a predetermined height, a plurality of leveling mechanisms configured to change a height of at least one object until the height of the at least one object equals the predetermined height, and at least one support attached to the plurality of leveling mechanisms and configured to support the at least one object.

Yet another aspect of the present disclosure relates to a method of transporting and leveling an object using a leveling system. In some embodiments, the method may be used with a leveling and transportation system. The leveling system includes at least one reference device, at least one leveling mechanism, and at least one support. The method includes emitting a signal using the at least one reference device. The signal indicates a predetermined height. The method also includes detecting the signal using the at least one leveling mechanism. The method further includes changing a height of the at least one leveling mechanism until the height of the at least one leveling mechanism is equal to the predetermined height. The method may also include emitting a laser beam using a single rotating laser beam projector. The method may further include detecting the laser beam with a sensor in the at least one leveling mechanism. The method may also include changing a height of the retractable chassis relative to the stanchion system. The method may further include arranging the at least one leveling mechanism into a transportation configuration such that the retractable chassis is in an extended position such that the at least one wheel is supporting the object and free to rotate. The method may also include arranging the at least one leveling mechanism into a stationary configuration such that the retractable chassis is in a retracted position such that the stanchion system is supporting the object.

There are other novel aspects and features of this disclosure. They will become apparent as this specification proceeds. Accordingly, this brief summary is provided to introduce a selection of concepts in a simplified form that are further described below in the detailed description. The summary and the background are not intended to identify key concepts or essential aspects of the disclosed subject matter, nor should they be used to constrict or limit the scope of the claims. For example, the scope of the claims should not be limited based on whether the recited subject matter includes any or all aspects noted in the summary and/or addresses any of the issues noted in the background.

BRIEF DESCRIPTION OF THE DRAWINGS

A further understanding of the nature and advantages of the embodiments may be realized by reference to the following drawings. In the appended figures, similar components or features may have the same reference label.

Figure 1:
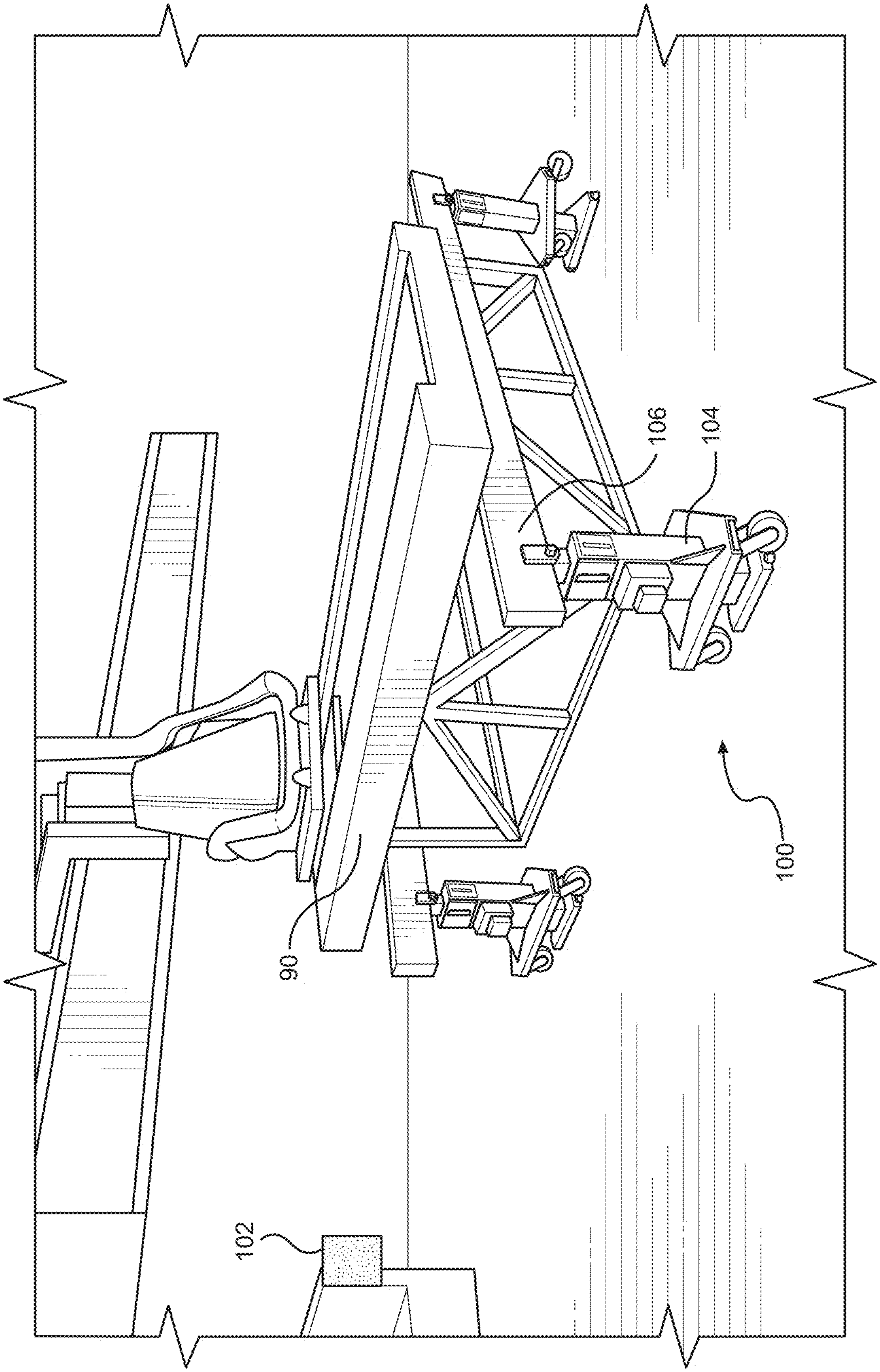
FIG. 1 illustrates a perspective view of an example object on an example leveling system in accordance with aspects of the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods disclosed herein relate to, among other things, a system and method for leveling objects during manufacturing of the objects. As discussed above, manufacturing certain objects may require the object to be level within a certain tolerance for the object to be manufactured within modern tolerance expectations. The objects may be manufactured by forming the object out of raw materials and then shaping the object into the desired shape by cutting, sawing, rasping, or otherwise removing material until the object has the desired shape. If the desired shape includes flat sides, the object needs to be level within a certain tolerance to ensure that once the material has been removed from the object, the object has a level and flat side within the predetermined manufacturing tolerance set for the object.

The systems and methods described herein enable an object to be leveled and transported within a manufacturing facility such that the object can be formed into a desired shape. If the desired shape includes flat sides, the systems and methods described herein enable the object to be leveled to within a predetermined tolerance such that equipment within the manufacturing facility can remove material from the object and the formed flat side will be level within the predetermined tolerance.

More specifically, the systems described herein include a leveling system including at least one reference device, at least one leveling mechanism, and at least one support. In the illustrated embodiments, the at least one reference device includes a device positioned at each station within a manufacturing facility that emits a signal that indicates a predetermined height for the leveling system to level an object at that station. The reference device enables the leveling system to be used at different stations within a facility where each station may require a different height. In the illustrated embodiments, the reference device emits a laser that indicates the desired height. In alternative embodiments, the reference device may emit any type of signal that may indicate a desired height.

The leveling mechanism is configured to both transport the object through the facility and to level the object at each station within the facility. In the illustrated embodiments, the leveling mechanism includes a retractable chassis and a stanchion system. The retractable chassis includes wheels that enable the leveling mechanism to transport the object and that are retractable such that the stanchion system supports the object at a predetermined height and within a predetermined tolerance of level for each station during manufacture of the object. The stanchion system includes a stable base that maintains the object at the predetermined height and within the predetermined tolerance of level for each station during manufacture of the object. The leveling mechanism is attached to the at least one support that supports the object at the predetermined height and within the predetermined tolerance of level for each station during manufacture of the object. In the illustrated embodiment, the support includes a support beam. In alternative embodiments, the support may be any support that enables the leveling system to operate as described herein including, but not limited to, a table or other support device.

In the illustrated embodiment, the leveling system includes a plurality of leveling mechanisms and a plurality of supports. For example, as shown in FIGS. 1-4, the leveling system includes two leveling mechanisms attached to the ends of a support beam. In alternative embodiments, the leveling system may include any number of leveling mechanisms and any number of supports that enable the leveling system to operate as described herein. For example, in some embodiments, the leveling system may include a single leveling mechanism attached to a single support (a table). In other embodiments, the leveling system includes four leveling mechanisms and two support beams with two leveling mechanisms attached to each support beam such that the two support beams support the object.

During operations, the object is placed on the leveling system including four leveling mechanisms and two support beams with two leveling mechanisms attached to each support beam such that the two support beams support the object. The leveling system is in a transportation configuration that is configured to enable the object to be transported throughout the manufacturing facility. Specifically, the retractable chassis is in an extended position such that the wheels are supporting the object and free to rotate. Once the object has been moved into position at a station within the manufacturing facility, the leveling system is moved into a stationary configuration that is configured to maintain the object in a stationary position within the station at the predetermined height and within the predetermined tolerance of level. Specifically, the reference device emits a laser throughout the station. The operator directs the leveling system to level the object and the leveling mechanisms each begin to retract the retractable chassis such that the stanchion system supports the object at the predetermined height and within the predetermined tolerance of level. The retractable chassis retracts until a sensor within the retractable chassis detects the laser emitted by the reference device. Once the sensor detects the laser, the retractable chassis stops retracting and the stanchion system supports the object at the predetermined height and within the predetermined tolerance of level. After the station has completed its task, the retractable chassis is extended, and the wheels are free to rotate and transport the object to the next station within the manufacturing facility.

As such, the systems and methods described herein enable a manufacturing facility to quickly and efficiently move an object through the facility and quickly and efficiently level the object such that the object can be shaped in a manufacturing facility to reduce costs and manufacturing time.

Figure 2:
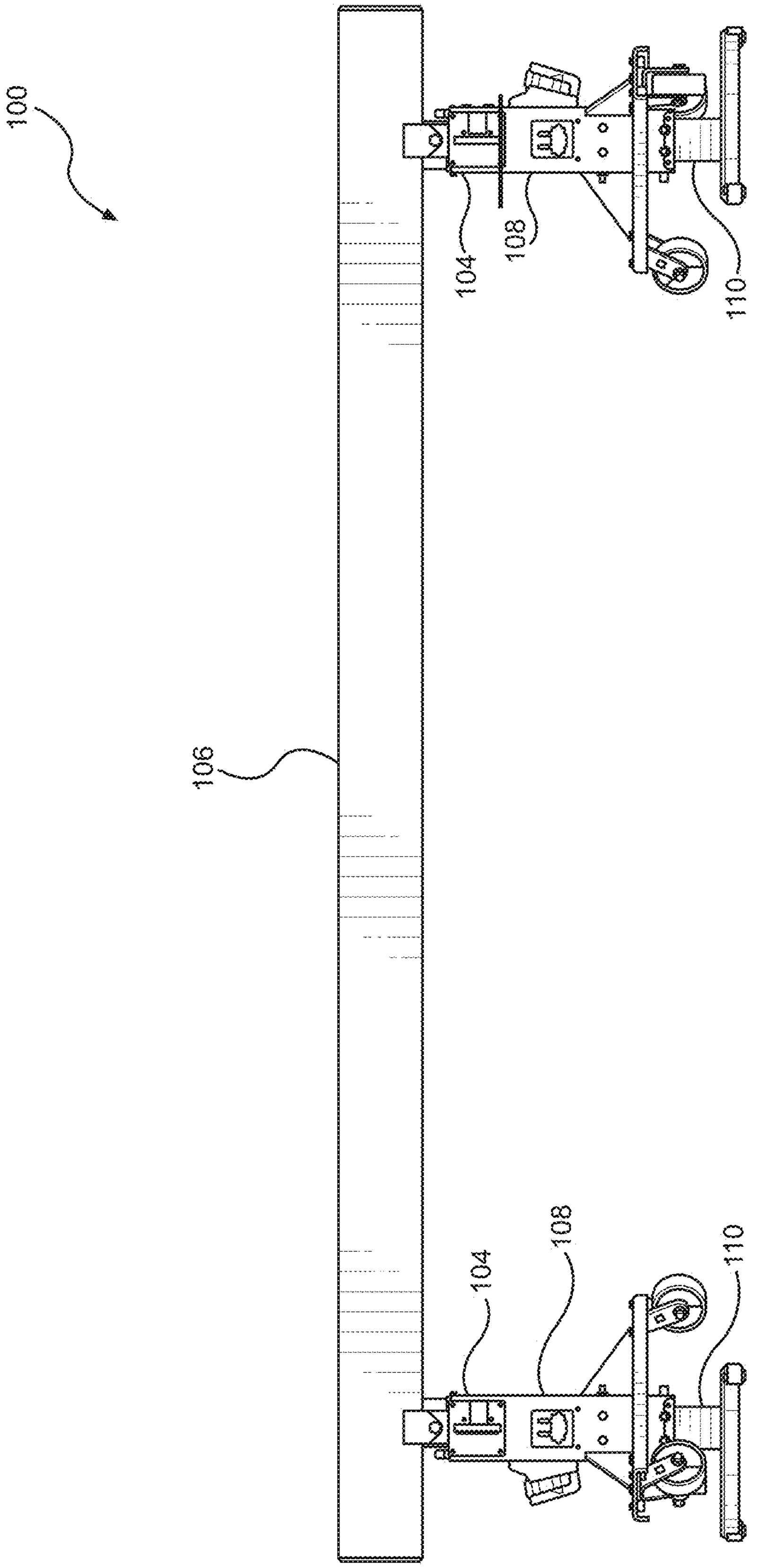
FIG. 2 illustrates a side view of the leveling system shown in FIG. 1 in accordance with aspects of the present disclosure.
Figure 3:
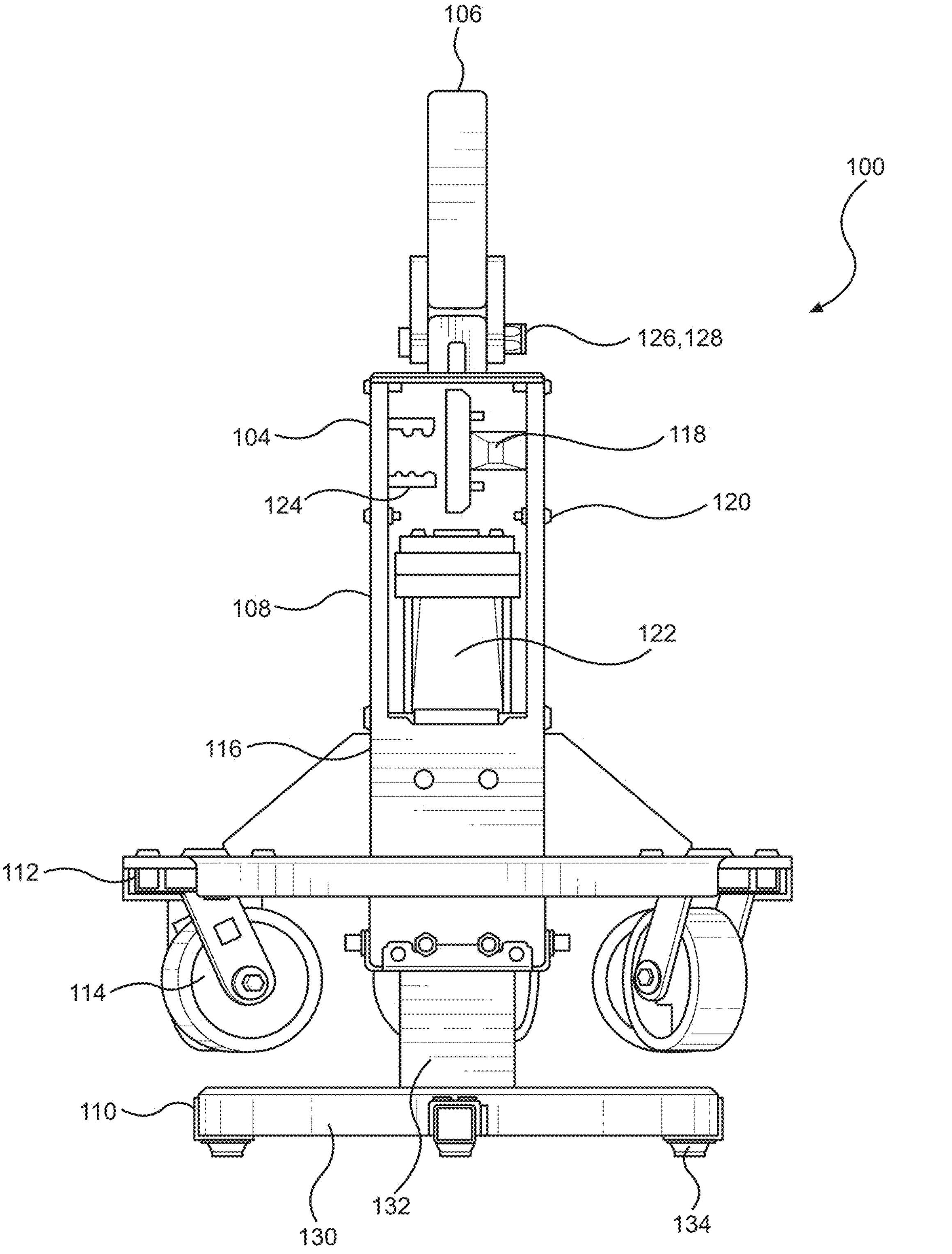
FIG. 3 illustrates an end view of the leveling system shown in FIG. 1 in accordance with aspects of the present disclosure.
Figure 4:
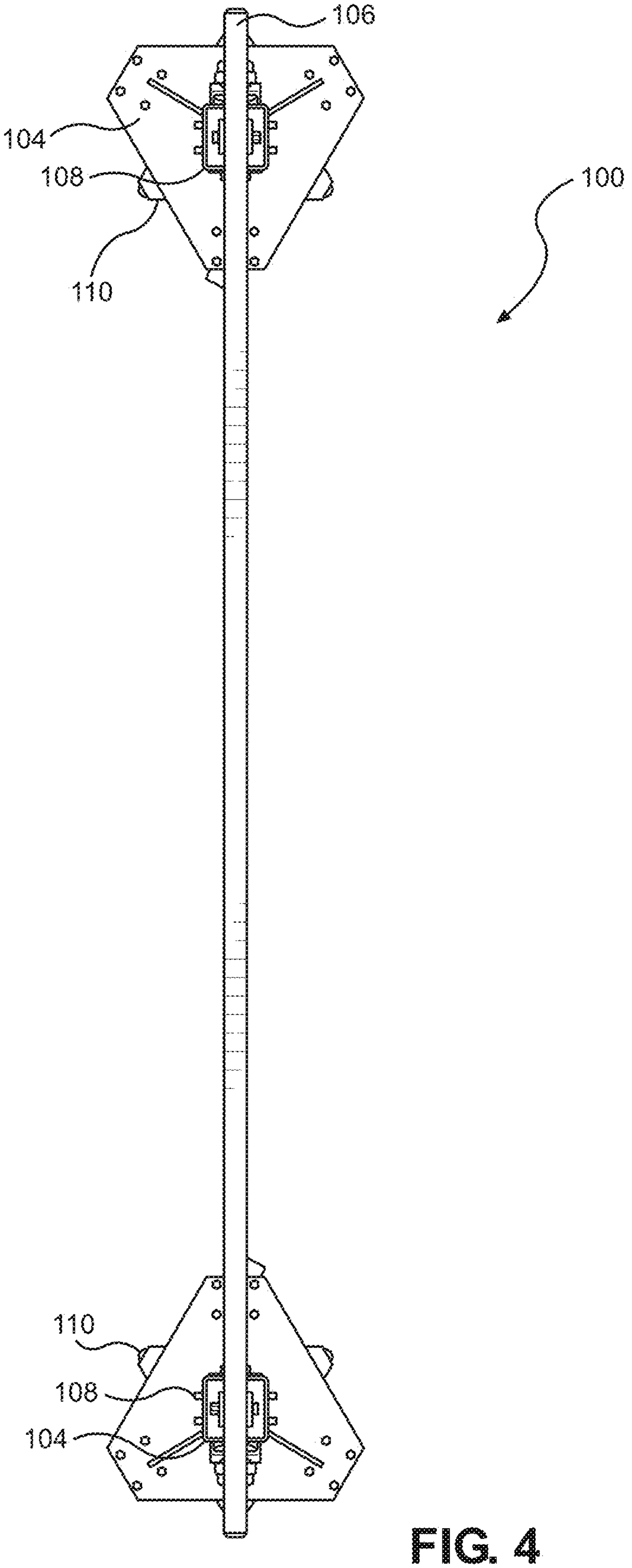
FIG. 4 illustrates a top view of the leveling system shown in FIG. 1 in accordance with aspects of the present disclosure.

FIG. 1 illustrates a perspective view of an example object 90 on an example leveling system 100 in accordance with aspects of the present disclosure. FIG. 2 illustrates a side view of the leveling system 100 shown in FIG. 1 in accordance with aspects of the present disclosure. FIG. 3 illustrates an end view of the leveling system 100 shown in FIG. 1 in accordance with aspects of the present disclosure. FIG. 4 illustrates a top view of the leveling system 100 shown in FIG. 1 in accordance with aspects of the present disclosure.

As shown in FIGS. 1-4, the leveling system 100 includes at least one reference device 102, at least one leveling mechanism 104, and at least one support 106. In the illustrated embodiments, the at least one reference device 102 includes a device positioned at each station within a manufacturing facility that emits a signal that indicates a predetermined height for the leveling system to level the object 90 at that station. The reference device 102 enables the leveling system to be used at different stations within a facility where each station may require a different height.

In the illustrated embodiments, the reference device 102 emits a laser that indicates the desired height. In alternative embodiments, the reference device may emit any type of signal that may indicate a desired height. In the illustrated embodiment, the reference device 102 includes a laser level including a rotating laser beam projector that is configured to project a laser beam in a plane about the reference device 102. As described herein, the leveling mechanism 104 detects the laser beam and levels the object based on the detected level.

In the illustrated embodiment, the at least one support 106 includes a support beam. In alternative embodiments, the support 106 may be any support that enables the leveling system 100 to operate as described herein including, but not limited to, a table or other support device. In some embodiments, the leveling system 100 includes a plurality of leveling mechanisms 104 and a plurality of supports 106. For example, as shown in the FIGS. 1-4, the leveling system 100 includes two leveling mechanisms 104 attached to the ends of a support beam 106. In alternative embodiments, the leveling system 100 may include any number of leveling mechanisms 104 and a number of supports 106 that enable the leveling system 100 to operate as described herein. For example, in some embodiments, the leveling system 100 may include a single leveling mechanism 104 attached to a single support (a table) 106. In other embodiments, the leveling system 100 includes four leveling mechanisms 104 and two support beams 106 with two leveling mechanisms 104 attached to each support beam 106 such that the two support beams 106 support the object.

In the illustrated embodiment, the leveling mechanism 104 includes a retractable chassis 108 and a stanchion system 110. The retractable chassis 108 is configured to enable the leveling mechanism 104 to transport the object 90 and to retract such that the stanchion system 110 supports the object at a predetermined height and within a predetermined tolerance of level for each station during manufacture of the object. The stanchion system 110 is configured to maintain the object at the predetermined height and within the predetermined tolerance of level for each station during manufacture of the object.

Specifically, as shown in FIGS. 1-4, the retractable chassis 108 includes a base 112, at least one wheel 114 attached to the base 112, a casing 116 extending from the base 112, a sensor 118 attached to the casing 116, a motor 120 within the casing 116, a power source 122, a control system 124, and a support attachment 126 attached to a top 128 of the casing 116.

In the illustrated embodiment, the base 112 has a substantially triangular shape and three wheels 114 are attached to the base 112. In alternative embodiments, the base 112 may have any shape that enables the leveling mechanism 104 to operate as described herein and the retractable chassis 108 may include any number of wheels 114 that enable the leveling mechanism 104 to operate as described herein.

The casing 116 has a generally tube-like shape or a cylindrical shape with a volume or hole through the center of the casing 116 to accommodate the stanchion system 110 as described below. The casing 116 circumscribes the stanchion 132. The casing 116 defines a cavity (not shown) that is configured to house the sensor 118, the motor 120, the power source 122, and the control system 124. As described herein, the casing 116 is configured to be moved vertically relative to the stanchion system 110 by the motor 120 in order to move the object 90 to the predetermined height and within the predetermined tolerance of level.

In the illustrated embodiment, the sensor 118 includes a laser sensor within the casing 116 that detects the laser emitted by the reference device 102.

In the illustrated embodiment, the motor 120 includes a servo within the casing 116 that moves the casing 116 vertically relative to the stanchion system 110 in order to move the object 90 to the predetermined height and within the predetermined tolerance of level.

In the illustrated embodiment, the power source 122 includes a battery pack plugged into the casing 116 that provides power to the sensor 118, the motor 120, the power source 122, and the control system 124. By proving power through a portable battery pack, the leveling system 100 can be completely portable throughout the manufacturing facility because the leveling system 100 is not restricted to a location with a power source. In alternative embodiments, the power source 122 may include a power cord configured to be plugged into a power source proximate to a station within the manufacturing facility.

In the illustrated embodiment, the control system 124 may include manual controls for raising or lowering the casing 116 vertically relative to the stanchion system 110 or may include automatic controls that enable the casing 116 to move vertically relative to the stanchion system 110 until the sensor 118 detects the laser beam emitted by the reference device 102. Additionally, the control system 124 may include any controls that enable the leveling system 100 to operate as described herein.

In the illustrated embodiment, the support attachment 126 includes a bracket configured to hold support 106 and to attach the casing 116 to the support 106. In alternative embodiments, the support attachment 126 may include any attachment mechanism that attaches the support 106 to the casing 116.

As shown in FIGS. 1-4, the stanchion system 110 includes a base 130, a stanchion 132 extending from the base 130, and feet 134 attached to the base 130. In the illustrated embodiment, the base 130 has a substantially triangular shape and three feet 134 attached to the base 130. In alternative embodiments, the base 130 may have any shape that enables the leveling mechanism 104 to operate as described herein and the stanchion system 110 may include any number of feet 134 that enable the leveling mechanism 104 to operate as described herein. The stanchion 132 includes a sturdy upright rod that provides support for the support 106 in the stationary configuration.

During operations, the object 90 is placed on the leveling system 100 including four leveling mechanisms 104 and two support beams 106 with two leveling mechanisms 104 attached to each support beam 106 such that the two support beams 106 support the object 90. The leveling system 100 is in a transportation configuration that is configured to enable the object 90 to be transported throughout the manufacturing facility. Specifically, the retractable chassis 108 is in an extended position such that the wheels 114 are supporting the object 90 and free to rotate. Once the object 90 has been moved into position at a station within the manufacturing facility, the leveling system 100 is moved into a stationary configuration that is configured to maintain the object 90 in a stationary position within the station at the predetermined height and within the predetermined tolerance of level. Specifically, the reference device 102 emits a laser throughout the station. The operator directs the leveling system 100 to level the object 90 and the leveling mechanisms 104 each begin to retract the retractable chassis 108 such that the stanchion system 110 supports the object 90 at the predetermined height and within the predetermined tolerance of level. The retractable chassis 108 retracts until the sensor 118 within the retractable chassis 108 detects the laser emitted by the reference device 102. Once the sensor 118 detects the laser, the retractable chassis 108 stops retracting and the stanchion system 110 supports the object 90 at the predetermined height and within the predetermined tolerance of level. After the station has completed its task, the retractable chassis 108 is extended and the wheels 114 are free to rotate and transport the object 90 to the next station within the manufacturing facility.

Figure 5:
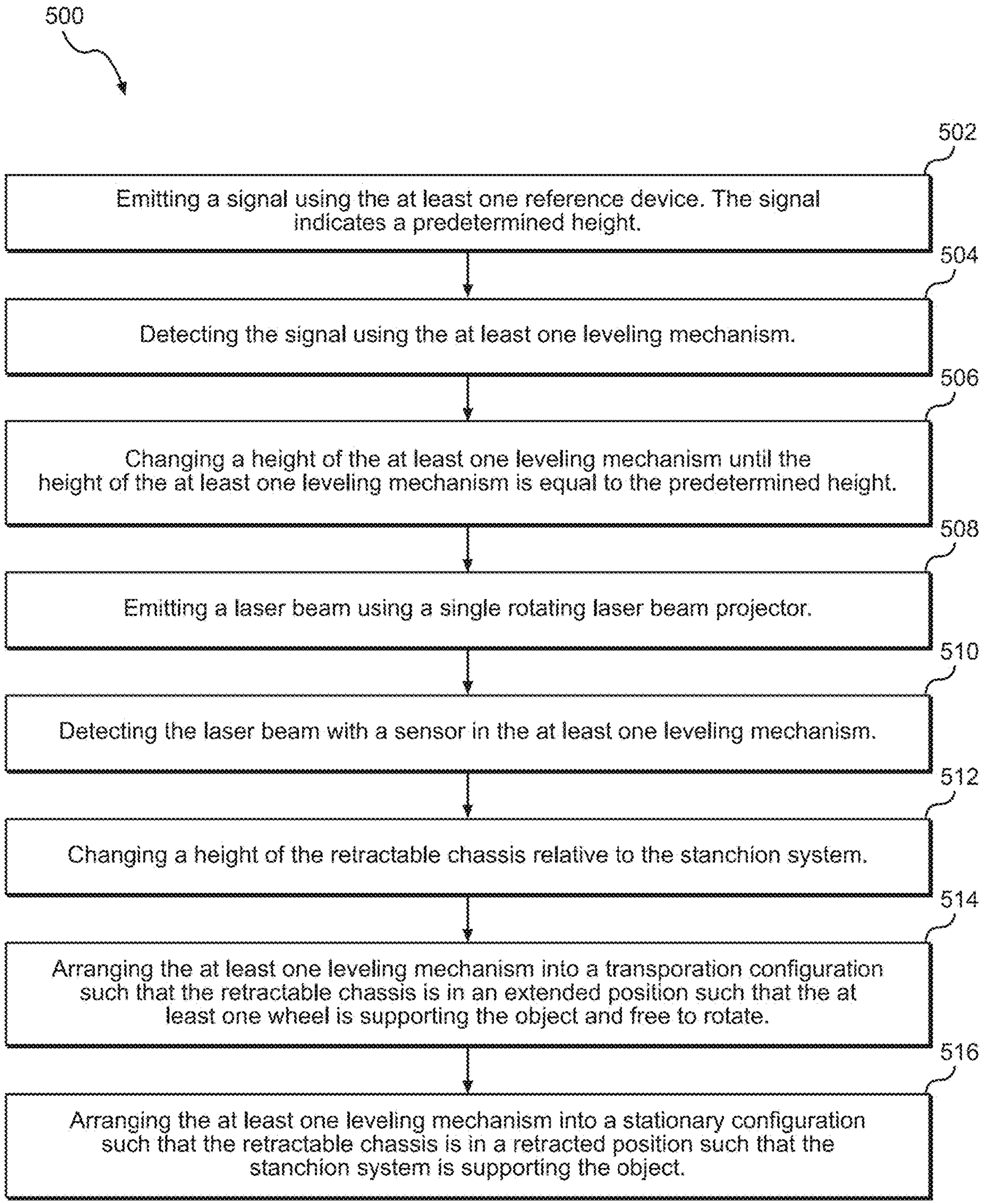
FIG. 5 illustrates a flow diagram of a method of transporting and leveling the object using the leveling system illustrated in FIGS. 1-4 in accordance with aspects of the present disclosure.

FIG. 5 illustrates a flow diagram of a method 500 of transporting and leveling the object 90 using the leveling system 100 illustrated in FIGS. 1-4 in accordance with aspects of the present disclosure. The method 500 includes emitting 502 a signal using the at least one reference device. The signal indicates a predetermined height. The method 500 also includes detecting 504 the signal using the at least one leveling mechanism. The method 500 further includes changing 506 a height of the at least one leveling mechanism until the height of the at least one leveling mechanism is equal to the predetermined height. The method 500 may also include emitting 508 a laser beam using a single rotating laser beam projector. The method 500 may further include detecting 510 the laser beam with a sensor in the at least one leveling mechanism. The method 500 may also include changing 512 a height of the retractable chassis relative to the stanchion system. The method 500 may further include arranging 514 the at least one leveling mechanism into a transportation configuration such that the retractable chassis is in an extended position such that the at least one wheel is supporting the object and free to rotate.

The method 500 may also include arranging 516 the at least one leveling mechanism into a stationary configuration such that the retractable chassis is in a retracted position such that the stanchion system is supporting the object.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

TERMINOLOGY AND INTERPRETATIVE CONVENTIONS

Any methods described in the claims or specification should not be interpreted to require the steps to be performed in a specific order unless stated otherwise. Also, the methods should be interpreted to provide support to perform the recited steps in any order unless stated otherwise.

Spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The terms have, having, include, and including should be interpreted to be synonymous with the terms comprise and comprising. The use of these terms should also be understood as disclosing and providing support for narrower alternative embodiments where these terms are replaced by "consisting of" or "consisting essentially of."

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any embodiment, feature, or combination of features described or illustrated in this document. This is true even if only a single embodiment of the feature or combination of features is illustrated and described in this document.

What is claimed:

1. A leveling system comprising:

at least one reference device configured to emit a signal that indicates a predetermined height;

a plurality of leveling mechanisms configured to change a height of at least one object until the height of the at least one object equals the predetermined height within a predetermined tolerance of level, each leveling mechanism of the plurality of leveling mechanisms including at least one wheel, a base, and a sensor configured to detect the signal, each leveling mechanism configured to independently change a height of the leveling mechanism until the sensor detects the signal and configured to transition between a transportation configuration in which the at least one wheel supports the at least one object and a stationary configuration in which the base supports the at least one object at the predetermined height; and at least one support attached to the plurality of leveling mechanisms and configured to support the at least one object.

2. The leveling system of claim 1, wherein each leveling mechanism of the plurality of leveling mechanisms comprises a retractable chassis and a stanchion system.

3. The leveling system of claim 2, wherein the stanchion system comprises the base, a stanchion extending from the base, and feet attached to the base.

4. The leveling system of claim 3, wherein the base has a substantially triangular shape and three feet attached to the base.

5. The leveling system of claim 2, wherein the retractable chassis comprises the base, the at least one wheel attached to the base, a casing extending from the base, the sensor attached to the casing, a motor within the casing, a power source, a control system, and a support attachment attached to a top of the casing.

6. The leveling system of claim 5, wherein the casing circumscribes a stanchion of the stanchion system.

7. The leveling system of claim 1, wherein each leveling mechanism comprises a control system configured to stop changing the height of the leveling mechanism in response to the sensor detecting the signal.

8. The leveling system of claim 1, comprising a plurality of reference devices, each reference device positioned at a respective station of a plurality of stations and configured to emit a respective signal indicating a respective predetermined height for that station.

9. A leveling system comprising:

at least one reference device configured to emit a signal that indicates a predetermined height;

a plurality of leveling mechanisms configured to independently change a height of at least one object until the height of the at least one object equals the predetermined height within a predetermined tolerance of level, each leveling mechanism of the plurality of leveling mechanisms including at least one wheel, a stable base, and a sensor configured to detect the signal, each leveling mechanism configured to independently change a height of the leveling mechanism until the sensor detects the signal and configured to transition between a transportation configuration in which the at least one wheel supports the at least one object and a stationary configuration in which the stable base supports the at least one object at the predetermined height within the predetermined tolerance of level in response to the sensor detecting the signal; and at least one support attached to and extending between at least two leveling mechanisms of the plurality of leveling mechanisms such that the at least two leveling mechanisms support the at least one object at spaced-apart locations.

10. The leveling system of claim 9, wherein the at least one support comprises a support beam attached to the at least two leveling mechanisms.

11. The leveling system of claim 10, wherein the at least one reference device comprises a single rotating laser beam projector configured to project a laser beam in a plane about the at least one reference device.

12. The leveling system of claim 9, wherein the plurality of leveling mechanisms comprises four leveling mechanisms.

13. The leveling system of claim 12, wherein the at least one support comprises two support beams each attached to two leveling mechanisms of the four leveling mechanisms.

14. The leveling system of claim 13, wherein the at least one reference device comprises a single rotating laser beam projector configured to project a laser beam in a plane about the at least one reference device.

15. A method of leveling an object using a leveling system, the leveling system comprising at least one reference device, at least one leveling mechanism, and at least one support, the method comprising:

emitting a signal using the at least one reference device, wherein the signal indicates a predetermined height;

detecting the signal using a sensor of the at least one leveling mechanism; and changing a height of the at least one leveling mechanism until the height of the at least one leveling mechanism is equal to the predetermined height within a predetermined tolerance of level; and transitioning the at least one leveling mechanism between a transportation configuration in which at least one wheel of the at least one leveling mechanism supports the object and a stationary configuration in which a base of the at least one leveling mechanism supports the object at the predetermined height in response to the sensor detecting the signal.

16. The method of claim 15, wherein emitting the signal using the at least one reference device comprises emitting a laser beam using a single rotating laser beam projector.

17. The method of claim 16, wherein detecting the signal using the at least one leveling mechanism comprises detecting the laser beam with the sensor in the at least one leveling mechanism.

18. The method of claim 15, wherein the at least one leveling mechanism comprises a retractable chassis and a stanchion system and changing a height of the at least one leveling mechanism until the height of the at least one leveling mechanism is equal to the predetermined height comprises changing a height of the retractable chassis relative to the stanchion system.

19. The method of claim 18, wherein the retractable chassis comprises the base and the at least one wheel attached to the base, the method further comprising arranging the at least one leveling mechanism into the transportation configuration such that the retractable chassis is in an extended position such that the at least one wheel is supporting the object and free to rotate.

20. The method of claim 19 further comprising arranging the at least one leveling mechanism into the stationary configuration such that the retractable chassis is in a retracted position such that the stanchion system is supporting the object.

* * * * *